United States Patent [19]

Rifi

[11] Patent Number: 5,076,988

[45] Date of Patent: Dec. 31, 1991

[54] PROCESS FOR THE EXTRUSION OF LOW DENSITY POLYETHYLENE

[75] Inventor: Mahmoud R. Rifi, Kendall Park, N.J.

[73] Assignee: Union Carbide Chemicals and Plastics Technology Corporation, Danbury, Conn.

[21] Appl. No.: 490,846

[22] Filed: Mar. 9, 1990

[51] Int. Cl.$^5$ .............................................. B29C 47/94
[52] U.S. Cl. ................................... 264/211; 264/564; 264/211.12; 264/236; 264/349
[58] Field of Search ................... 264/211, 211.21, 564, 264/169, 211.12, 349, 236

[56] References Cited

U.S. PATENT DOCUMENTS

| 3,658,980 | 4/1972 | Caiola et al. | 264/211 |
| 4,012,478 | 3/1977 | Horikawa et al. | 264/211 |
| 4,100,245 | 7/1978 | Horikawa et al. | 264/211 |
| 4,490,323 | 12/1984 | Thomson | 264/211 |
| 4,594,213 | 6/1986 | Ealer | 264/564 |
| 4,913,874 | 4/1990 | Pinchuk et al. | 264/564 |

FOREIGN PATENT DOCUMENTS

| 3630682 | 8/1987 | Fed. Rep. of Germany | 264/211 |
| 59-41240 | 3/1984 | Japan | 264/169 |
| 60-203419 | 10/1985 | Japan | 264/211 |

Primary Examiner—Jeffery Thurlow
Attorney, Agent, or Firm—Saul R. Bresch

[57] ABSTRACT

A process for extrusion, which requires:
(i) Blending low density polyethylene having a density equal to or less than about 0.915 gram per cubic centimeter with a liquid hydrocarbon oil in an amount of about 5 to about 30 parts by weight of oil per 100 parts by weight of low density polyethylene; and
(ii) extruding the blend.

13 Claims, No Drawings

5,076,988

PROCESS FOR THE EXTRUSION OF LOW DENSITY POLYETHYLENE

TECHNICAL FIELD

This invention relates to a process for the extrusion of polyethylene, which has a density equal to or less than about 0.915 gram per cubic centimeter (low density polyethylene).

BACKGROUND INFORMATION

The low modulus of commercial rubbers such as ethylene/propylene copolymers (EPM) and plasticized polyvinyl chloride (PVC) make these rubbers very useful in such applications as hose and tubing. In addition, PVC finds extensive use in film and other applications in which compliance with Food & Drug Administration (FDA) requirements is necessary. Because of its higher modulus, polyethylene including low density Polyethylene has found limited utility in the aforementioned applications even though it has other advantageous qualities such as toughness and chemical resistance.

DISCLOSURE OF THE INVENTION

An object of this invention, therefore, is to provide a process which will not only serve to extrude the polyethylene into, for example, hose, tubing, and film, but will reduce its modulus to a level at which it will be competitive with its EPM and PVC counterparts.

Other objects and advantages will become apparent hereinafter.

According to the present invention, the above object is met by a process for extrusion comprising:

(i) blending polyethylene having a density equal to or less than about 0.915 gram per cubic centimeter with a liquid hydrocarbon oil in an amount of about 5 to about 30 parts by weight of oil per 100 parts by weight of polyethylene; and (ii) extruding the blend.

DESCRIPTION OF THE PREFERRED EMBODIMENTS

Low density polyethylene, as that term is used herein, is a copolymer of ethylene and a minor amount of one or more alpha-olefins having at least 3 carbon atoms, and preferably having 4 to 8 carbon atoms. The low density polyethylene can be prepared by the process described in European Patent Application No. 0 120 501 published on Oct. 3, 1984. (The corresponding U.S. application is Ser. No. 281,927 filed on Dec. 5, 1988).

The low density polyethylene can be in the form of porous granules or pellets. The porous granules of the low density polyethylene generally have a diameter in the range of about 25 microns to about 2500 microns. Regardless of its form, the low density polyethylene has a density equal to or less than about 0.915 gram per cubic centimeter, preferably in the range of about 0.870 to about 0.915 gram per cubic centimeter. If the low density polyethylene is in pellet form, the blending step is carried out with the polyethylene in the molten state.

The molecular weight of the low density polyethylene can be in the range of about 100,000 to about 300,000 and is preferably in the range of 150,000 to about 250,000. Thus, the melt index is in the range of about 0.05 to about 10 grams per 10 minutes and is preferably in the range of about 0.1 to about 1.5 grams per 10 minutes. Melt index is determined under ASTM D-1238, Condition E. It is measured at 190° C. and reported as grams per 10 minutes.

The Portion of the copolymer attributed to the alpha-olefin comonomers can be in the range of about 5 to about 50 percent by weight based on the weight of the copolymer and is preferably in the range of about 10 to about 30 percent by weight based on the weight of the copolymer. The balance of the copolymer is based on ethylene. The preferred comonomers are 1-butene, 1-hexene, and 1-octene.

The liquid hydrocarbon oil is generally a petroleum derived processing oil commonly used in the compounding and extruding of rubber compositions. The major oil type present in any of these oils can be aromatic or aliphatic. Examples of these liquid hydrocarbon oils are paraffin oils, naphthenic oils, and mineral oils. Liquid polybutene can also be included among the examples. Mixtures of the various oils can be used, if desired. The oils can have a viscosity in the range of about 100 to about 3000 SUS (Saybolt Universal Seconds) at 100° F. (37.8° C.) and preferably have a viscosity of at least about 2500 SUS at 100° F.

In the case of porous granular low density polyethylene, the oils are usually dry blended with the polyethylene prior to extrusion (preblending), but the oil and resin can be blended in the extruder itself, if desired. Preblending is preferable, however, since it shortens the mixing time and is a key factor in achieving uniform distribution of the oil in the resin. In the case of pelletized low density polyethylene, the low density polyethylene is in the molten state when the blending is initiated. The amount of oil introduced into the blend can be in the range of about 5 to about 30 parts by weight of oil per 100 parts by weight of low density polyethylene and is preferably in the range of about 5 to about 20 parts by weight of oil. The low density polyethylene mixes readily with the oil without the use of heat except, as noted, when it is in pelletized form. Mixers and extruders useful in carrying out the process of the invention are conventional off-the-shelf equipment. A typical extruder is described in U.S. Pat. No. 4,857,600. Mixers, which can be used to blend the resin and the oil, are Banbury or other internal mixers, two roll mills, or Baker Perkins or similar sigma blade mixers, As noted, extruders can also be used to mix the resin and the oil.

Advantages of the blend are improved processability in the extruder, e.g., a fractional melt index will display the extrusion behavior of a to 2 melt index resin; avoidance of bleeding when oil is used in preferred amounts; extrusion can be conducted under less pressure and amperage without sacrificing production rates; hose and tubing made from the combination of high molecular weight low density polyethylene and oil, when compared to plasticized PVC, have a lower brittle point, a higher softening temperature, and better chemical and environmental resistance; and, with respect to extruded film, the oil modified low density polyethylene displays improved puncture dart drop and clarity. The production of film from the oil modified low density polyethylene is particularly useful in the preparation of products, which must meet FDA requirements. Thus, a low density polyethylene with, for example, a 0.910 g/cc density, which meets FDA requirements, can be blended with an oil, which also meets FDA requirements. The result is a product which has the properties of a low density polyethylene having a lower density than 0.910 g/cc and still meets the FDA requirements.

Polyethylenes, in general, display poor compression set and resiliency. Compression set, which is determined under ASTM-D-395-85, is defined as the amount (in percent) by which a standard test piece fails to return to its original thickness after being subjected to a standard compression load for a fixed period of time. The better the compression set, i.e., the lower the percent, the more resilient the polymer. One more advantage of the oil modified low density polyethylene is its improved compression set relative to the unmodified low density polyethylene. The compression set is further improved by crosslinking the oil modified low density polyethylene.

Crosslinking is accomplished by using conventional techniques. The oil modified low density polyethylene can be crosslinked by adding a crosslinking agent to the composition or by making the resin hydrolyzable, which is accomplished by adding hydrolyzable groups, such as —Si(OR)$_3$ wherein R is a hydrocarbyl radical, to the resin structure through copolymerization or grafting.

Suitable crosslinking agents are organic peroxides such as dicumyl peroxide; 2,5-dimethyl-2,5-di(t-butylperoxy)hexane; t-butyl cumyl peroxide; and 2,5-dimethyl-2,5-di(t-butylperoxy)hexane-3. Dicumyl peroxide is preferred.

Hydrolyzable groups can be added, for example, by copolymerizing ethylene with an ethylenically unsaturated compound having one or more —Si(OR)$_3$ groups such as vinyltrimethoxysilane, vinyltriethoxysilane, and gammamethacryloxypropyltrimethoxysilane or by grafting these silane compounds to the resin in the presence of the aforementioned organic peroxides. The hydrolyzable resins are then crosslinked by moisture in the presence of a silanol condensation catalyst such as dibutyltin dilaurate, dibutyltin diacetate, stannous acetate, lead naphthenane, and zinc caprylate. Dibutyltin dilaurate is preferred.

Conventional additives can be added to the oil modified low density polyethylene during the preblending step and/or the extrusion step. The amount of additive is usually in the range of about 0.01 to about 60 percent by weight based on the weight of the resin. Useful additives are antioxidants, ultraviolet absorbers, antistatic agents, pigments, dyes, fillers, slip agents, fire retardants, plasticizers, processing aids, lubricants, stabilizers, smoke inhibitors, viscosity control agents, vulcanizing agents, crosslinking agents, crosslinking catalysts, and crosslinking boosters.

The patent and patent applications mentioned in this specification are incorporated by reference herein.

The invention is illustrated by the following examples.

EXAMPLES 1 to 4

Porous granular low density polyethylene having a density of 0.910 gram per cubic centimeter and prepared using the catalyst and process described in European Patent Application 0 120 501, referred to above, is used in the examples. The comonomer is 1-hexene. The oil is a paraffin oil having a viscosity of 2540 SUS at 100° F.

The low density polyethylene and the oil are mixed in a ribbon blender for 15 minutes. The mixture is then pelletized, and the pellets are extruded in an extruder to provide a film having a thickness of 0.001 inch. The extruder operates at 60 revolutions per minute, the die gap (or die diameter) in the extruder is 1 mil or 0.001 inch; and the BUR is 2:1. The BUR is the blow-up ratio. This is the ratio of die diameter to bubble diameter. The bubble diameter is 2 × layflat/pi. The "layflat" refers to the width of the flattened bubble.

It is found that the modulus of the oil modified low density polyethylene is approximately the same as otherwise equivalent commercial EPM's and PVC's.

TABLE

|  | Example | | | |
|---|---|---|---|---|
|  | 1 | 2 | 3 | 4 |
| Melt index (g/10 min) | 1 | 1 | 0.5 | 0.5 |
| amount of oil (% by wt) | 0 | 10 | 0 | 10 |
| pressure (psig) | 2400 | 1900 | 2500 | 2000 |
| melt temperature (°F.) | 444 | 435 | 446 | 437 |
| amps | 13.5 | 11.6 | 13.8 | 12.2 |
| production rate (lbs/hr) | 26.6 | 28.2 | 26.5 | 27.6 |

Notes to Table:
1. Melt index is determined as noted above.
2. The amount of oil is the percent by weight oil based on the combined weight of the low density polyethylene in the oil.
3. Amps refers to the current passing through the drive motor, which turns the screw.
4. The production rate is the number of pounds of film produced by the extruder per hour.

I claim:
1. An extrusion process comprising:
   (i) blending polyethylene having a density equal to or less than 0.910 gram per cubic centimeter and having a molecular weight of at least about 150,000 and a melt index equal to or less than about 1 gram per 10 minutes with a liquid hydrocarbon oil in an amount of about 5 to about 20 parts by weight of oil per 100 parts by weight of polyethylene; and
   (ii) extruding the blend.
2. The process defined in claim 1 wherein the polyethylene is in a porous granular form.
3. The process defined in claim 1 wherein the blending is conducted with the polyethylene in the molten state.
4. The process defined in claim 1 wherein the density of the polyethylene is above about 0.870 gram per cubic centimeter.
5. The process defined in claim 1 wherein the molecular weight of the polyethylene is no greater than about 250,000.
6. The process defined in claim 3 wherein the molecular weight of the polyethylene is in the range of about 150,000 to about 250,000.
7. The process defined in claim 1 wherein the melt index of the polyethylene is no less than about 0.05 gram per 10 minutes.
8. The process defined in claim 7 wherein the melt index is at least about 0.1 gram per 10 minutes.
9. The process defined in claim 1 wherein the oil is a paraffin oil, a naphthenic oil, a mineral oil, polybutene, or a mixture of two or more of such oils.
10. The process defined in claim 1 wherein the viscosity of the oil is in the range of about to about 6000 SUS at 100° F.
11. The process defined in claim 1 wherein the viscosity of the oil is at least about 2500 SUS at 100° F.
12. The process defined in claim 1 wherein the polyethylene and the oil are blended in an extruder.
13. The process defined in claim 1 wherein a crosslinking agent is blended with the polyethylene or incorporated into the mixture of polyethylene and oil during extrusion, and crosslinking of the polyethylene is effected either during or after extrusion.

* * * * *

UNITED STATES PATENT AND TRADEMARK OFFICE
CERTIFICATE OF CORRECTION

PATENT NO. : 5,076,988
DATED : December 31, 1991
INVENTOR(S) : M. R. Rifi

It is certified that error appears in the above-identified patent and that said Letters Patent is hereby corrected as shown below:

Column 2, line 49, before "to 2", insert --1--.

Column 4, line 6 (between line 5 and TABLE), insert --Variables and conditions are set forth in the Table:--

Column 4, line 44, change "250,000" to --500,000--.

Column 4, line 57, after "in the range of about", insert --100--.

Signed and Sealed this

Twentieth Day of April, 1993

Attest:

MICHAEL K. KIRK

*Attesting Officer*  Acting Commissioner of Patents and Trademarks